(12) United States Patent
Aguirre Quintana et al.

(10) Patent No.: US 9,370,851 B2
(45) Date of Patent: Jun. 21, 2016

(54) CARBON ELECTRODE FROM HIGH ELECTROCATALYTIC ACTIVITY WASTES: METHOD FOR OBTAINING AND APPLICATION

(75) Inventors: María J. Aguirre Quintana, Santiago (CL); Maria del Carmen Arevalo Morales, Santiago (CL); Mauricio I. Casanova, Santiago (CL); Betty Matsuhiro Yamamoto, Santiago (CL); Lenora M. Espindola, Santiago (CL); Julio R. Figueroa, Santiago (CL)

(73) Assignee: Universidad de Santiago de Chile, Santiago (CL)

( * ) Notice: Subject to any disclaimer, the term of this patent is extended or adjusted under 35 U.S.C. 154(b) by 580 days.

(21) Appl. No.: 13/697,527

(22) PCT Filed: May 13, 2011

(86) PCT No.: PCT/CL2011/000030
§ 371 (c)(1),
(2), (4) Date: Nov. 12, 2012

(87) PCT Pub. No.: WO2012/155285
PCT Pub. Date: Nov. 22, 2012

(65) Prior Publication Data
US 2013/0209346 A1    Aug. 15, 2013

(30) Foreign Application Priority Data
May 13, 2010   (CL) .................................... 487-2010

(51) Int. Cl.
| H01M 10/54 | (2006.01) |
| B24B 1/00 | (2006.01) |
| H01M 4/583 | (2010.01) |
| H01M 4/62 | (2006.01) |
| C25B 11/12 | (2006.01) |

(52) U.S. Cl.
CPC . B24B 1/00 (2013.01); C25B 11/12 (2013.01); H01M 4/583 (2013.01); H01M 4/625 (2013.01); H01M 10/54 (2013.01); Y02W 30/84 (2015.05)

(58) Field of Classification Search
CPC ................................ B24B 1/00; H01M 10/54
USPC .................. 423/445 R; 451/54; 429/121–347
See application file for complete search history.

(56) References Cited

U.S. PATENT DOCUMENTS

| 2003/0158059 A1 | 8/2003 | Sakai et al. |
| 2005/0241943 A1 | 11/2005 | Kakuta et al. |
| 2007/0134546 A1 | 6/2007 | Hashimoto |
| 2009/0258298 A1 | 10/2009 | Umeno et al. |
| 2010/0077611 A1 | 4/2010 | Fujita et al. |

OTHER PUBLICATIONS

International Search Report and Written Opinion mailed Nov. 10, 2011, in corresponding PCT Application No. PCT/CL11/00030.

Primary Examiner — James Lee
(74) Attorney, Agent, or Firm — Locke Lord LLP; Bryan D. Zerhusen; Nicholas J. DiCeglie, Jr.

(57) ABSTRACT

The present invention refers to a procedure for obtaining a carbon electrode from acid cell wastes with extremely high electrocatalytic activity that can be used as cathode or anode for various applications such as electrochemistry, electroplating, electrolytic refining, etc. One of its most interesting applications is in the field of sensor electrodes. The process comprises the stages of: a) extraction of the carbon from the cell and then removing its covering; b) boiling in distilled water between 5 and 30 minutes; c) washing the electrode with detergent, preferably neutral; d) sanding and washing with boiling water and then with detergent until no residue is obtained; e) sonicating between 5 and 30 minutes in distilled water; f) subjecting the electrode to washing with petroleum ether or other highly nonpolar solvent; g) sonicating and washing with organic solvents from low to high polarity, ending with water and changing the water until clean water is obtained; h) boiling the electrode in a solution containing a strong oxidant and acid pH during 5 minutes to one hour; i) repeating the washing and sonication procedure if necessary; j) polishing in the conventional manner for its use; and k) if desired, it can be inserted in teflon or PVC to insulate part of the surface. The electric connection can be made by making an inner thread in the carbon.

15 Claims, 13 Drawing Sheets

US 9,370,851 B2

CARBON ELECTRODE FROM HIGH ELECTROCATALYTIC ACTIVITY WASTES: METHOD FOR OBTAINING AND APPLICATION

CROSS-REFERENCE TO RELATED APPLICATIONS

This application is the U.S. national phase application pursuant to 35 U.S.C. §371 of PCT International Patent Application No. PCT/CL2011/000030, filed May 13, 2011, which claims priority to Chilean Patent Application No. 00487-2010, filed May 13, 2010. The contents of these applications are incorporated herein by reference in their entirety.

The present invention refers to a procedure for making a carbon electrode from acid cells (CB) with extremely high electrocatalytic activity, which can be used as cathode or anode in various applications such as electrochemistry, electroplating, electrolytic refining, etc. One of its more interesting applications is in the field of sensor electrodes.

The electrode obtained by this procedure is an electrode whose activity is similar to that of the platinum electrodes useds in electrochemistry. It is an electrode that catalyzes diverse oxidation and reduction reactions at lower potentials than glassy carbon (GC) or pyrolytic graphite electrodes, and its results resemble those obtained using platinum. Like every carbon electrode, it is polishable and its surface is renewable, an it can also be cut to size.

BACKGROUND OF THE INVENTION

Acid cells or batteries have a high percentage of carbon among their components. Those components can have various uses and there have been attempts to give a concrete use to disposable batteries that have completed their useful life. In previous art there have been numerous recycling processes for cells and batteries. For example, in document EP 0274059 of Jul. 27, 1988, titled "Process for recycling electric batteries, mounted printed circuit boards and electronic components" reveals a process for recycling electric batteries, mixtures of high power batteries for equipment having different chemical composition, as well as printed circuit boards and electronic components, by pyrolysis of the mixture which is carried out at a temperature between 450 and 650° C. Then the electrolysis of the pyrolysis residue is carried out, followed by the separation of the products of the electrolysis and the removal of the products accumulated on the electrodes. In this process, which is economically beneficial, residues that are non contaminating to the environment are generated and an initial selection of the material is not necessary.

Document WO 2005/101564, of Oct. 27, 2005, titled " Procedure for recycling of a mixture of anode cells and batteries based on lithium", refers to a procedure for the hydrometallurgical treatment of batteries that comprise at least an anode based on lithium, a salt dissolved in an electrolyte, and a cathode that comprises at least a metal and a combination of metals chosen among cobalt, nickel, manganese, and iron, with the objective of recovering the usable fractions, a procedure characterized because it comprises dry grinding at ambient temperature in an inert atmosphere, treatment by means of at least a magnetic separation and using a densiometric table followed by aqueous hydrolysis, with the objective of recovering at least the lithium in the form of lithium carbonate or phosphate, an anion of that electrolyte salt, and a concentrate based on at least one metal from that cathode.

None of the documents of the previous art reveals some kind of procedure for the specific recycling of the carbon contained in cells and batteries.

From what has been stated above, the present invention has the purpose of getting a carbon electrode from acid cells (CB) wastes with extremely high electrocatalytic activity that can be used as cathode or anode for various applications such as electrochemistry, electroplating, electrolytic refining, among others, some of its preferred applications being in the field of sensor electrodes.

The manufacture of carbon electrodes depends on the specific purposes of their application and on the origin of the raw material used. Because of the above, prior art also provides procedures for the manufacture of carbon electrodes. For example, document ES 8605050 of Mar. 16, 1986, titled "Manufacture of carbonaceous bodies, particularly carbon electrodes", reveals a procedure for the production of carbonaceous bodies, in particular electrodes, with a parallelepiped, cubic or cylindrical shape for the electrolysis of aluminium by calcination of raw shaped bodies, which contain pyrolizable substances, in a tunnel furnace, in an oxiodizing atmosphere where the products of the distillation that are released by the binder are burnt completely. The carbonaceous bodies are produced from a mass of petroleum coke, anthracite, soot, graphite, or similar products added as binders, like coal-tar or tar. During the cooking of shaped bodies of this kind the binder is cooked, yielding desired mechanical and electric characteristics.

Document WO 2004/020365 of Mar. 11, 2004, titled "Process for the preparation of carbon electrodes", describes a procedure for the preparation of carbon electrodes. This procedure comprises the following stages: (a) combination of a filling material, a coal-tar binder and carbon fibers derived from mesophase tar or PAN. Those fibers have a mean length between 4.23 mm and 82.55 mm (⅙ of an inch and 3.25 inches, respectively) to form an electrodestock in which the carbon fibers are present preferentially at a level of 0.5 to 10 parts by weight of the carbon fibers per 100 parts by weight of the filling material; (b) extrusion of the electrodestock to form green electrodestock; (c) cooking of the green electrodestock to form a charred electrodestock; (d) graphitization of the electrodestock by keeping the electrodestock charred at a temperature of at least 2,500° C. with the purpose of forming an electrode; and (e) selection of the amount of carbon fibers in relation to the filling material with the purpose of getting control of the electrode's longitudinal coefficient of thermal expansion (CET).

Document ES 0165308 of Apr. 16, 1944, titled "Procedure for obtaining carbon electrodes" reveals a procedure for obtaining carbon electrodes and the corresponding electrode dough starting from filling materials that contain carbon and the usual binders, which comprises adding to the binders, especially the soft tar, hydrochloric acid and/or chlorides that break up the hydrochloric acid when they react with the binder, to achieve improvements in the quality of gross briquettes and in the quality of the reheated electrode. In this way the number of cracks decreases and the working temperature interval increases. In this process the binders can be mixed with the additions that contain chlorine, adding them afterwards to the filling materials that contain carbon, or else the filling materials and the binders can be mixed first, in the usual manner, making preferentially, after mixing thoroughly, the additions that contain chlorine. None of the documents of the previous art reveals a procedure for obtaining carbon electrodes using as raw material carbon from acid cell (CB) wastes with extremely high electrocatalytic activity. The present invention has the objective of giving an appropriate use to the carbon contained in cells and batteries, for the manufacture of carbon electrodes, which can be used as cathodes or anodes in various applications such as in electrochemistry, electroplating, electrolytic refining, with one of their most interesting applications in the field of sensor electrodes.

For that purpose the present invention proposes a procedure that consists in extracting the carbon from the cell and then removing its covering, and then it must be boiled in distilled water and washed with boiling distilled water, and then with high purity neutral detergent until no more residues is obtained. The process also comprises sonicating in distilled water and subjecting the electrode to washing with petroleum ether or some other highly nonpolar solvent. Sonicating and washing with organic solvents from low to high polarity, reaching clean water, and then boiling the electrode in a solution containing a strong oxidant at an acid pH. These washing and sonicating steps can be repeated if necessary. Finally, the process comprises polishing in a conventional manner for its use. If desired, it can be inserted in teflon or PVC to insulate part of the surface. The electric connection can be made by forming an inner thread in the carbon.

BRIEF DESCRIPTION OF THE DRAWINGS

The attached drawings, which are included to provide better understanding of the invention, are incorporated and constitute part of this description, one of the executions of the invention, and together with the description serve to explain the principles of this invention.

DESCRIPTION OF THE INVENTION

The present invention refers to a procedure for extracting the carbon used in acid cells and subjecting it to chemical and physical processes to convert it into an electrode material of very high electrocatalytic activity.

The objective is to obtain a carbon electrode, mostly with $sp^2$ carbons, very few functional groups like carbonyl, carboxyl, alcohol, or others detectable by IR (infrared absorption spectroscopy); metals like Fe, Cu and others in trace concentrations, amorphous state, according to the data obtained by IR spectroscopy, by elemental analysis, and by X-ray diffraction spectroscopy.

The surface cleaned with felt or sandpaper allows being used as electrocatalyst with activity similar to that of carbon nanotubes. If it is polished with alumina and felt, its behavior is similar to that of glassy carbon. This electrode can be cut with a glass grinder, producing a sandable surface exactly the same as the initial one. That is to say, the composition is homogeneous throughout the whole system. The electrode is fragile and can break if it is hit. However, it is also feasible to drill a hole in it and thread it to connect it to an electric connector. On the other hand, contact can also be made with a metal clamp or a wire carefully wound around it.

Figure 1:
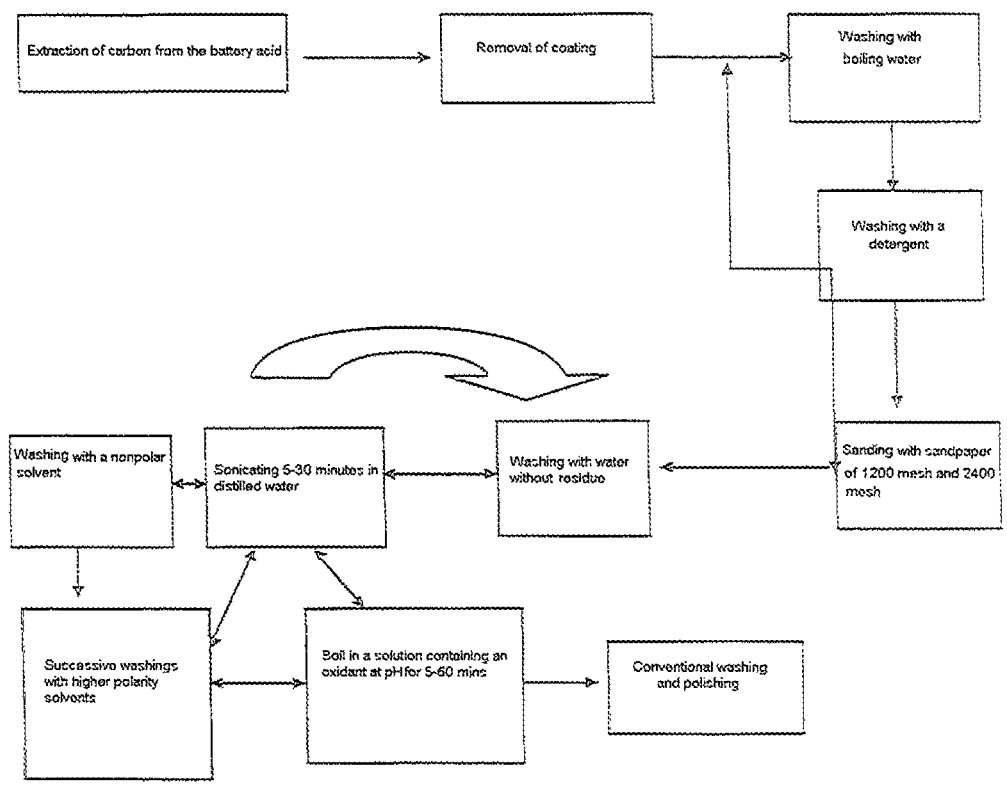
FIG. 1 shows a scheme of the treatment of carbon from new or used acid cells.
Figure 2:
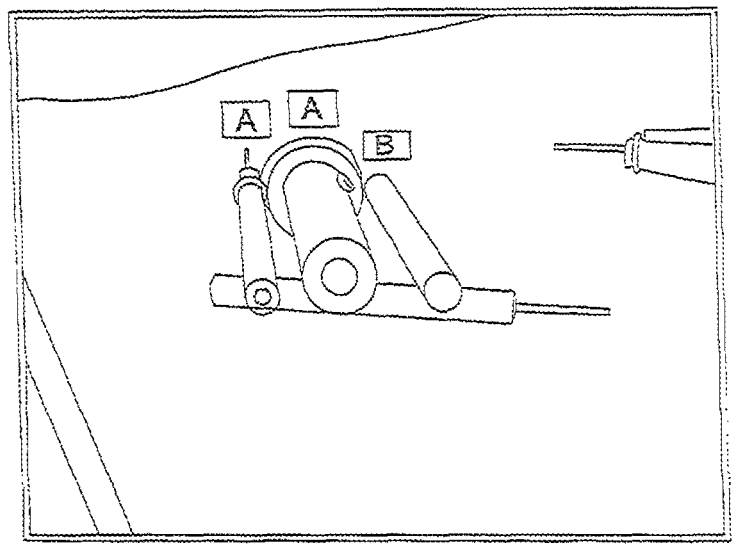
FIG. 2 shows a prepared electrode insulated with teflon tape.

As shown in FIG. 1, the first step consists in extracting the carbon from the battery and then removing its covering. It must then be boiled in distilled water between 5 and 30 minutes or until no residues are observed in the distilled water, washed with a detergent, preferably neutral, sanded and washed with boiling distilled water and then with a high purity neutral detergent until no residues are obtained. Then sonicate between 5 and 30 minutes in distilled water. Subject the electrode to washing with petroleum ether or some other highly nonpolar solvente. Sonicate and wash with organic solvents of small to high polarity until clean water is reached. Boil the electrode in a solution that contains a strong oxidant and acid pH during 5 minutes to one hour. Repeat the washing and sonicating procedure if necessary. Polish in a conventional way for its use. If desired it can be inserted in teflon or PVC to insulate part of the surface. The electric connection can be made by making an inner thread in the carbon. FIG. 2B shows an electrode that is ready, after its preparation, insulated at one end with teflon tape. FIG. 2A shows two commercial electrodes, one covered with teflon and the other with plastic. Both made of glassy carbon.

Figure 3:
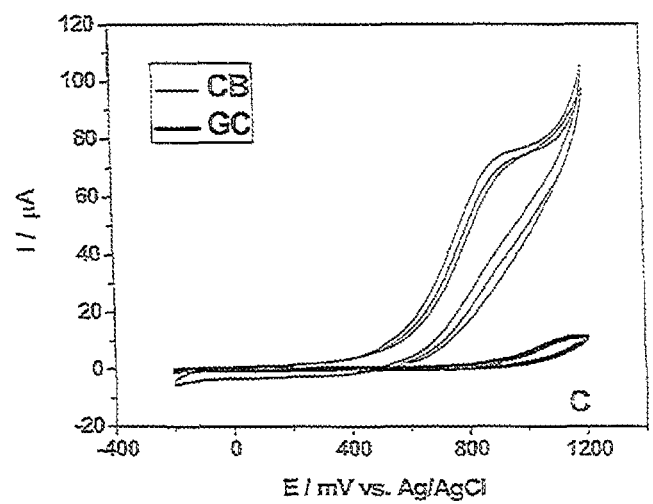
FIG. 3 shows the electrocatalytic response of the proposed electrode (CB) compared to a commercial electrode (GC) in the oxidation of bisulfite. This measurement was made at pH 4, with a sulfite concentration of 140 ppm (measured as $SO_2$) in a 12% v/v ethanol:water mixture at 5 $mVs^{-1}$.

The electrocatalytic response of the proposed electrode (CB) compared to a commercial electrode (GC) to the oxidation of bisulfite is shown in FIG. 3. This measurement was made at pH 4, with a sulfite concentration of 140 ppm (measured as $SO_2$) in a 12% v/v ethanol:water mixture at 5 $mVs^{-1}$.

The electroactivity difference is seen at the bottom of the oxidation wave (voltage) in both cases. This difference accounts for the decrease in the energy "expense" meant by using electrode CB instead of GC under identical working conditions. In this case the bottom of the wave for CB is approximately 320 mV, and 820 mV for GC. That is, electrode CB generates a net saving of approximately 0.5 V to catalyze the same reaction.

Figure 4:
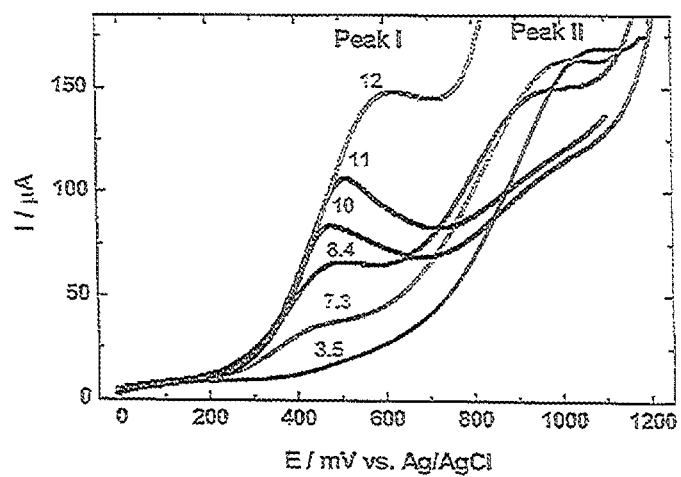
FIG. 4 shows the electrode's capacity to discriminate the signal. Since the electrocatalytic activity of the CB is extremely high, over the same voltage interval it succeeds in oxidizing independently the sulfite species and the bisulfite species that coexist in solution.

Signal discrimination is shown in FIG. 4. Since the electrocatalytic activity of CB is extremely high, over the same voltage interval it succeeds in oxidizing independently the sulfite species and the bisulfite species that coexist in solution.

Figure 5A:
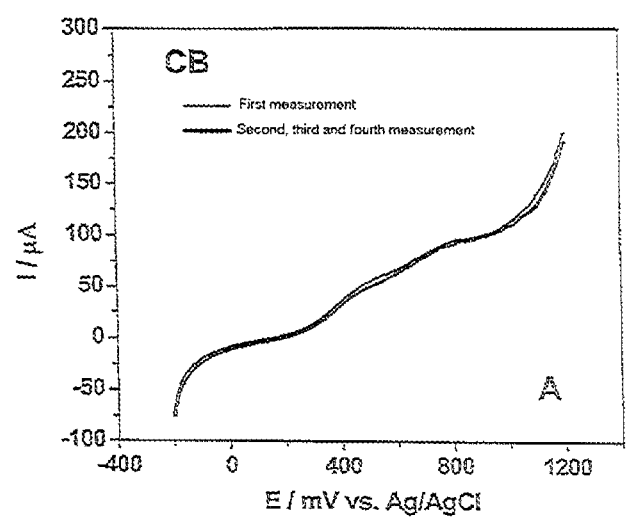
FIG. 5 shows the stability of the electrode's response.
Figure 5B:
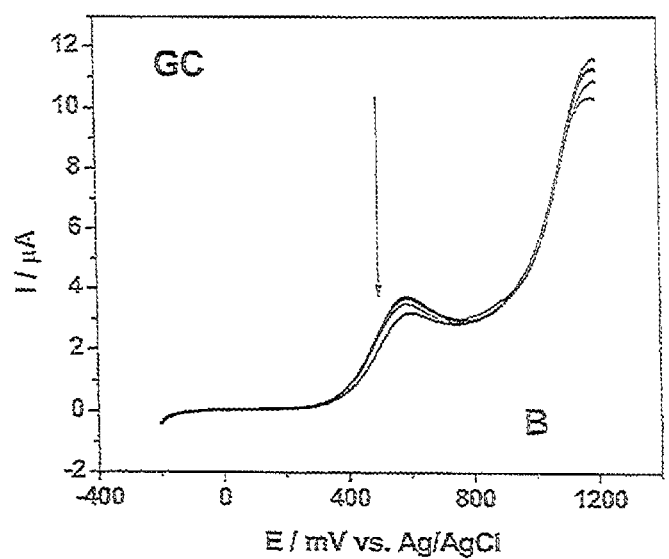

FIGS. 5A and 5B show four consecutive measurements of the oxidation of sulfite at pH 9 when the electrode is CB (Figure A) and when it is GC (FIG. 5B). In FIG. 5A it is seen that four measurements that correspond to CB give a single response. On the other hand, GC shows a small decrease between each signal (from the first to the fourth) until it finally stabilizes. Those same results are obtained if the electrode is removed from the solution, nitrogen is bubbled through it to avoid the entrance of oxygen, and then it is measured again. Once more, in the case of CB the reproducibility is immediate, while electrode GC must be subjected to various measurements before a stable profile is reached.

Figure 6A:
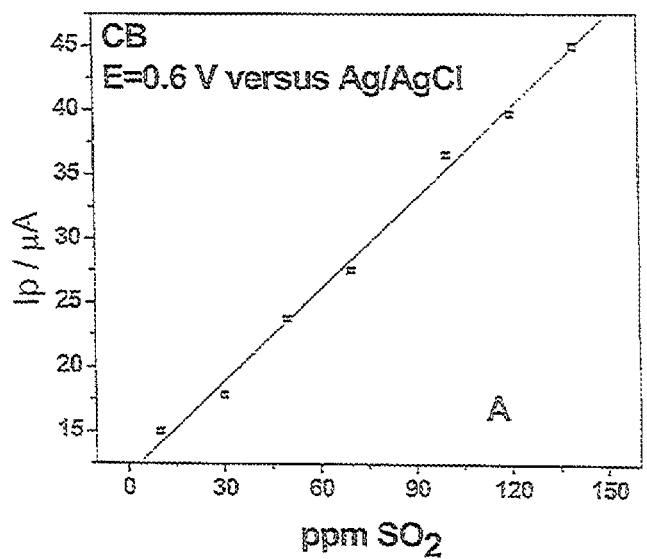
FIG. 6 shows the ability of the CB electrode to act as amperometric sensor.
Figure 6B:
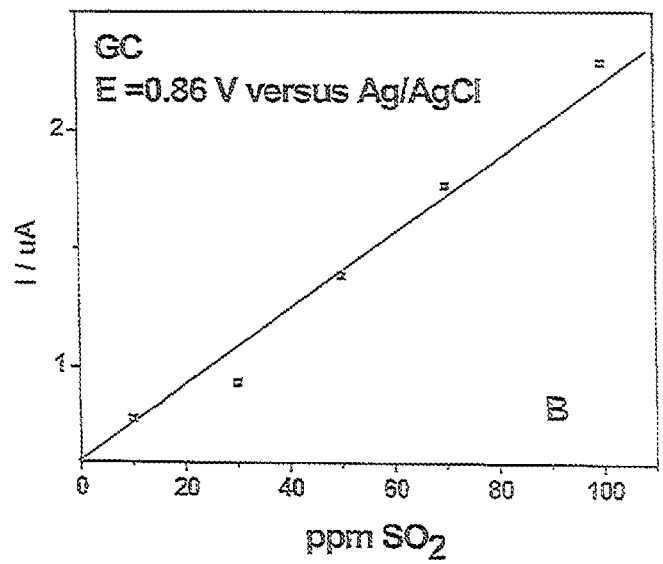

FIGS. 6A and 6B show the relations between the current measured at a fixed voltage and sulfite concentration. The existing linearity (and the slope) are indicators of the capacity of an electrode to be used as sensor for a given substance. FIG. 6A shows electrode CB, with good linearity between current and concentration for solutions with a sulfite content of 20 to 150 ppm measured as $SO_2$, at pH 9. A linear behavior is also seen, but with a lower regression coefficient, for GC (see FIG.

Figure 7A:
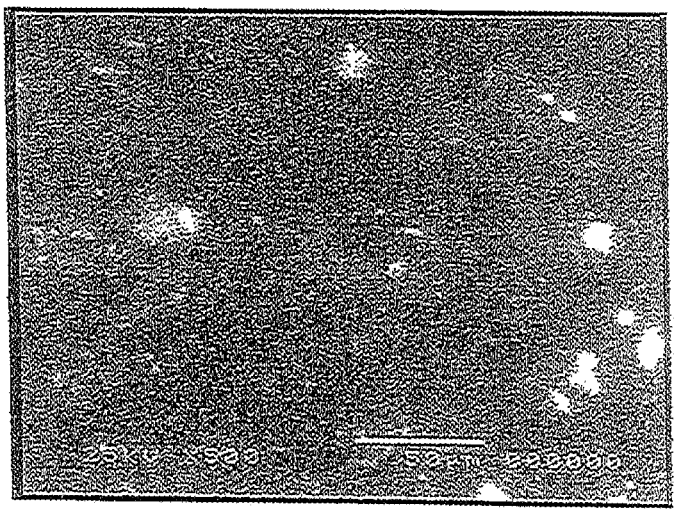
FIG. 7 shows the morphological SEM-EDX analysis. OK
Figure 7B:
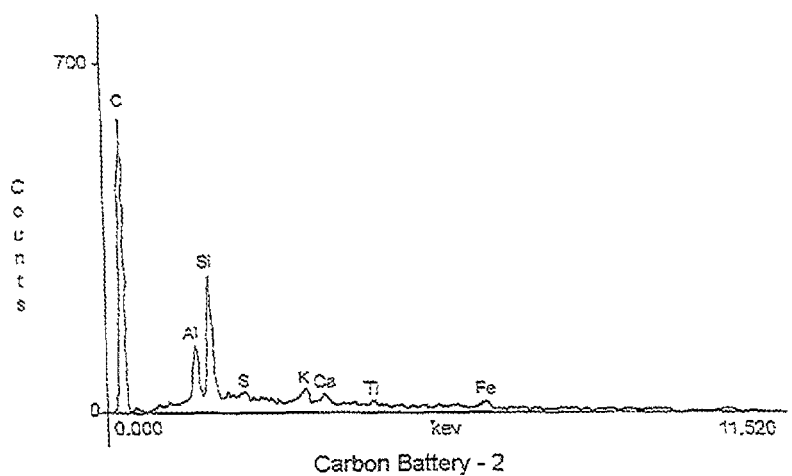

6B). On the other hand, due to the electroactivity of CB compared to GC, the slope in FIG. 6A is greater (one order of magnitude) than that obtained in the case of GC (B). Obviously, the greater the slope, the easier it is for the electrode and the more sensitive it is to small variations in concentration, i.e., its behavior as sensor is better. An amorphous but homogeneous distribution with some bright points that correspond to silica inlays (Al—Si) from the polishing process is shown in FIG. 7A. FIG. 7B shows an analysis by SEM-EDX miscroscopy. It shows a minor presence of S, K, Ca, Ti, and Fe. An SEM-EDX analysis, both general and specific, was made of two samples of different origin. The quantitative analysis of the surfaces indicates the presence of the following ions or elements: $Na^+$, $K^+$, $Ca^{2+}$, $Mg^{2+}$, Al, Fe, S, Si. Depending on the samples that are analyzed, they are found in variable amounts, but in an average proportion of less than 5%, with Si and Al as the more abundant. In the analyzed samples the presence of oxygen is not detected.

Figure 8:
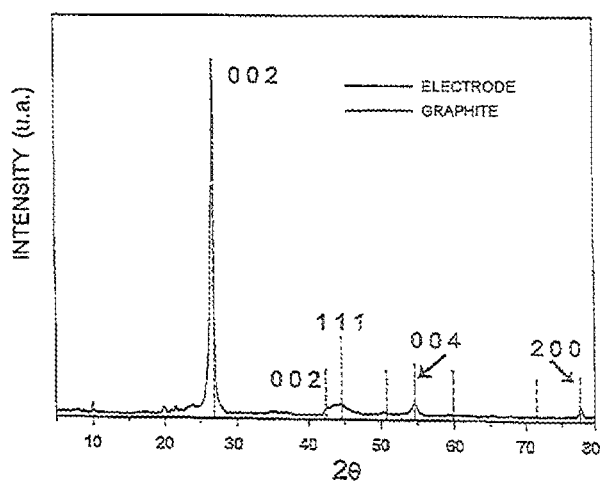
FIG. 8 shows a powder X-ray diffractogram.

The X-ray powder diffractogram was compared with the JCPDS-ICDD database, as shown in FIG. 8, which shows the signals characteristic of graphite. The X-ray powder diffractogram was also compared with a calculated powder diagram. The hkl 002 planes are clearly identified, with a $2\theta=26.477°$ value, as well as the signals corresponding to the hkl 004 and 200 planes, with values of $2\theta=54.525°$ and $2\theta=77.541°$, respectively, showing the laminar characteristics of the sample.

From the analysis of the powder diffractogram it is concluded that the sample presents high crystallinity, since a very narrow signal characteristic of the 002 value is seen. On the other hand, the interplanar distance is 3.364 Å, indicating that there are no species inserted in the planes of the graphite.

Also, the diffractogram shows signals that cannot be assigned by the database used. They correspond to the presence of chemical compounds at the impurity level, as indicated by EDX analysis.

Therefore, the powder diffractogram leads to the conclusion that the sample is formed mostly by carbonaceous species of the graphite type.

On the other hand, no other significant (<5%) crystalline species assignable with the database used are observed.

Figure 9:
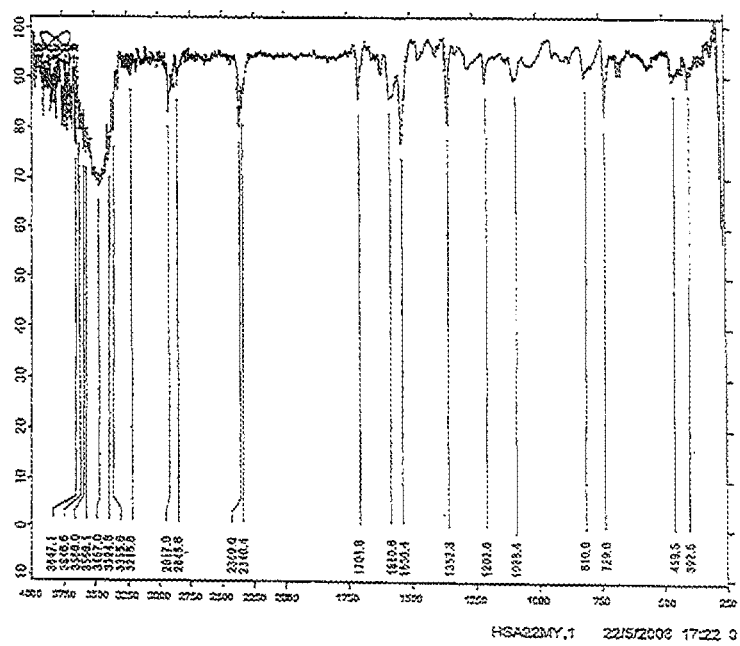
FIG. 9 shows an IR spectrum of the sample.

The IR spectrum of the powder, which indicates a small amount of carbonyl groups, is shown in FIG. 9.

Figure 10:
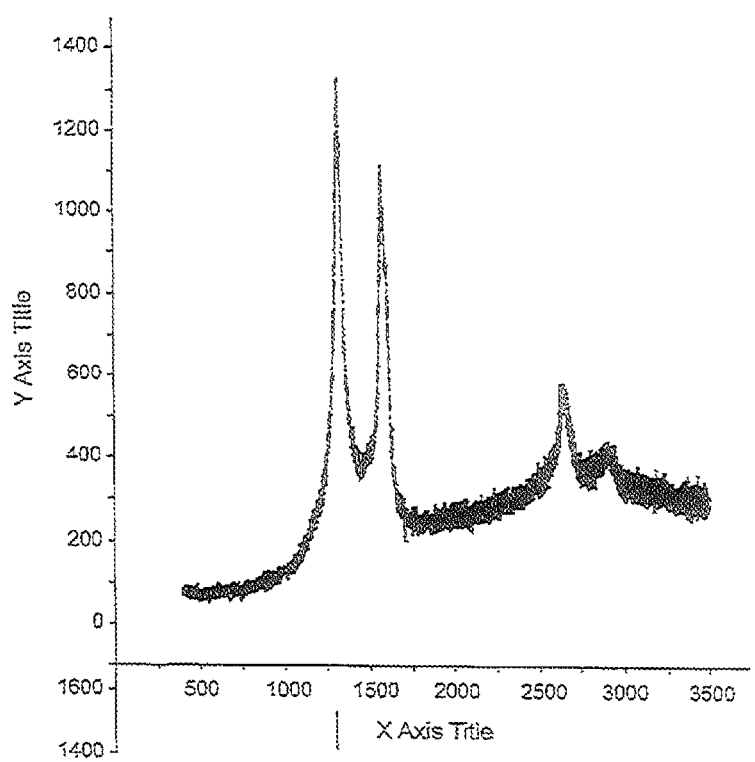
FIG. 10 shows a Raman spectrum of the sample.

As seen in FIG. 10, the Raman spectrum shows the characteristic signal of the $sp^2$ carbons of graphite, similar to the spectra of carbon nanotubes.

To get the results described above, the present invention proposes a procedure that comprises the following stages: a) extract the carbon from the cell and then remove its covering; b) boil in distilled water between 5 and 30 minutes; c) wash the electrode with detergent, preferably neutral; d) sand and wash with boiling water and then with detergent until no more residues are obtained; e) sonicate between 5 and 30 minutes in distilled water; f) subject the electrode to washing with petroleum ether or some other highly nonpolar solvent for a period of between 5 to 30 minutes; g) sonicate and wash with organic solvents from low to high polarity, ending with water and changing the water until clean water is obtained; h) boil the electrode in a solution containing a strong oxidant at acid pH during 5 minutes to 1 hour; i) repeat the washing and sonicating procedure if necessary; j) polish conventionally for its use; and k) if desired, it can be inserted in teflon or PVC to insulate part of the surface. The electric connection can be made by making an inner thread in the carbon.

EXAMPLE OF APPLICATION

A new Durapower brand acid cell was used. The carbon was removed manually from the battery, which is opened with a sharp knife or scissors. The carbon was removed and sanded at its ends with rough wood or metal sandpaper to facilitate breaking the covering that it has. In the case of the example, 200 mesh sandpaper was used. The covering was removed completely until the carbon was left completely uncovered. The electrode was immersed in a beaker containing boiling distilled water during 15 minutes. It was then washed with cold distilled water and a neutral detergent. Once clean, the whole surface was sanded with finer (1200 mesh) and then even finer (2400 mesh) sandpaper. The electrode was then boiled in distilled water again, changing the distilled water until no more residues are seen in it. In the case of the example, 2 washes of 5 minutes each were made in boiling distilled water. The electrode was then placed in a beaker with distilled water in a sonicator and was sonicated during 2 minutes, changing the water until no more residues were seen in the water. Care must be taken so that the electrode does not hit the walls of the beaker. In this case it was sonicated 4 times, finding that after the third sonication the water was clear.

The clean and dry electrode was immersed in petroleum ether during 20 minutes at ambient temperature. Then the sonication process was carried out again, this time sonicating twice during 15 minutes in distilled water. The electrode was then washed carefully with alcohol (ethanol), then with acetone, and then with distilled water. The electrode was then immersed in a bath of boiling acidified distilled water during 30 minutes. Then it was washed abundantly with water, leaving it ready to be polished or sanded for use.

With the electrodes obtained from new or used cells of different sizes and origin, all of them acid, this treatment can be applied to obtain electrochemically equal surfaces. The cylinders obtained can be drilled even with a common drill to make their electric connection, or they can be held at one end with a metal clamp, and the resistance between the clamp and the other end of the electrode is measured with a common commercial tester set to measure resistance, and a resistance of 0.00 ohm should be read. They can also be covered with teflon or plastic to offer a surface with a well defined geometric area.

The invention claimed is:

1. A method for obtaining a carbon electrode from acid battery wastes, wherein the method comprises the steps of:
    a) extracting the carbon electrode from the acid battery wastes, and then removing a covering from the carbon electrode;
    b) boiling the carbon electrode in distilled water;
    c) washing the carbon electrode with detergent;
    d) sanding and washing the carbon electrode with boiling water and then with detergent until no more residue is obtained;
    e) sonicating the carbon electrode in distilled water;
    f) subjecting the carbon electrode to washing with petroleum ether or some other nonpolar solvent;
    g) sonicating and washing the carbon electrode with organic solvents from low to high polarity, ending with washing with water and changing said water that was used for washing until clean water is obtained;
    h) boiling the carbon electrode in a solution that contains a strong oxidant at acid pH;
    i) repeating the sonicating and washing procedure according to step g) if necessary; and
    j) polishing the carbon electrode for use.

2. A method for obtaining a carbon electrode, according to claim 1, wherein step (a) further comprises sanding the extracted carbon electrode.

3. A method for obtaining a carbon electrode, according to claim 2, wherein said step of sanding according to step a) is done with rough metal or wood sandpaper, at ends of the extracted carbon electrode, to facilitate breaking the covering.

4. A method for obtaining a carbon electrode according to claim 2, further comprising removing the covering until the carbon electrode remains completely uncovered.

5. A method for obtaining a carbon electrode, according to claim 1, wherein a time range for performing step (b) is extended until no residues are observed in the boiling distilled water.

6. A method for obtaining a carbon electrode, according to claim 5, wherein in step (b) the carbon electrode is immersed in the boiling distilled water between 5 and 30 minutes.

7. A method for obtaining a carbon electrode, according to claim 1, wherein in step (c) the carbon electrode is washed with cold distilled water and neutral detergent.

8. A method for obtaining a carbon electrode, according to claim 1, wherein in step (e) the sonication of the carbon electrode is carried out between 5 to 30 minutes.

9. A method for obtaining a carbon electrode, according to claim 1, wherein in step (f) the carbon electrode is immersed in petroleum ether during 5 to 30 minutes at ambient temperature.

10. A method for obtaining a carbon electrode, according to claim 1, wherein in step (h) the carbon electrode is boiled during 5 to 60 minutes.

11. A method for obtaining a carbon electrode, according to claim 1, wherein the carbon electrode is washed with alcohol, then with acetone, and then with distilled water.

12. A method for obtaining a carbon electrode, according to claim 11, wherein the alcohol used is ethanol.

13. A method for obtaining a carbon electrode, according to claim 1, wherein the carbon electrode is immersed in a bath of acidified distilled water containing a strong oxidant at boiling temperature for 30 minutes.

14. A method for obtaining a carbon electrode, according to claim 1, further comprising step k) in which the carbon electrode is inserted in teflon or PVC to insulate part of a surface of the carbon electrode.

15. A method for obtaining a carbon electrode, according to claim 1, wherein an electric connection can be made by making an inner thread in the carbon electrode.

\* \* \* \* \*